US012812680B2

(12) United States Patent
Omiya et al.

(10) Patent No.: US 12,812,680 B2
(45) Date of Patent: Nov. 24, 2026

(54) WIRELESS COMMUNICATION SYSTEM, WIRELESS COMMUNICATION METHOD AND WIRELESS BASE STATION DEVICE

(71) Applicant: NTT, Inc., Tokyo (JP)

(72) Inventors: Riku Omiya, Musashino (JP); Junichi Iwatani, Musashino (JP); Akira Kishida, Musashino (JP); Shinya Otsuki, Musashino (JP); Yusuke Asai, Musashino (JP); Tomoaki Ogawa, Musashino (JP); Yasushi Takatori, Musashino (JP)

(73) Assignee: NTT, Inc., Tokyo (JP)

(*) Notice: Subject to any disclaimer, the term of this patent is extended or adjusted under 35 U.S.C. 154(b) by 336 days.

(21) Appl. No.: 18/712,808

(22) PCT Filed: Nov. 29, 2021

(86) PCT No.: PCT/JP2021/043668
§ 371 (c)(1),
(2) Date: May 23, 2024

(87) PCT Pub. No.: WO2023/095347
PCT Pub. Date: Jun. 1, 2023

(65) Prior Publication Data

US 2025/0024499 A1 Jan. 16, 2025

(51) Int. Cl.
*H04W 74/0816* (2024.01)
*H04W 64/00* (2009.01)
*H04W 76/10* (2018.01)

(52) U.S. Cl.
CPC ....... *H04W 74/0816* (2013.01); *H04W 64/00* (2013.01); *H04W 76/10* (2018.02)

(58) Field of Classification Search
CPC . H04W 74/0816; H04W 64/00; H04W 76/10; H04W 74/0808; H04W 24/10; H04W 72/04; H04W 84/12
See application file for complete search history.

(56) References Cited

U.S. PATENT DOCUMENTS

| | | | | |
|---|---|---|---|---|
| 2009/0247201 A1* | 10/2009 | Ye | H04W 16/14 | 455/509 |
| 2012/0281643 A1* | 11/2012 | Sun | H04W 24/10 | 370/329 |

(Continued)

FOREIGN PATENT DOCUMENTS

| | | | | |
|---|---|---|---|---|
| TW | 201325275 A | * | 6/2013 | H04L 5/0035 |

OTHER PUBLICATIONS

Khorov et al., "Current Status and Directions of IEEE 802.11be, the Future Wi-Fi 7", IEEE Access, vol. 8, May 8, 2020, pp. 88664-88688.

(Continued)

*Primary Examiner* — Austin J Moreau
(74) *Attorney, Agent, or Firm* — XSENSUS LLP

(57) ABSTRACT

The wireless communication system includes a plurality of wireless terminals each including a plurality of wireless interfaces corresponding to a plurality of channels in different frequency bands, and a wireless base station device that establishes wireless communication with the wireless terminals. Each of the wireless terminals performs channel sensing, and transmits sensing information including an identifier of a sensed channel, a sensing result of the channel, and an identifier of the wireless terminal. The wireless base station device calculates and stores a sensing time for each of the wireless terminals on the basis of the sensing information, the sensing time being an accumulated value of time required for sensing by the wireless terminal, and allocates (Continued)

a reward according to the sensing time to each of the plurality of wireless terminals.

20 Claims, 10 Drawing Sheets

(56) References Cited

U.S. PATENT DOCUMENTS

| | | | | |
|---|---|---|---|---|
| 2013/0157580 | A1* | 6/2013 | Qiu | H04W 16/14 455/67.11 |
| 2019/0053189 | A1* | 2/2019 | Ramamurthy | G01S 5/02521 |
| 2022/0394818 | A1 | 12/2022 | Sadeghi et al. | |
| 2025/0142413 | A1 | 5/2025 | Aygül et al. | |

OTHER PUBLICATIONS

Office Action dated Apr. 22, 2026 in the related U.S. Appl. No. 18/712,721 (29 pages).
Final Office Action mailed Sep. 30, 2026 in related U.S. Appl. No. 18/712,721 (18 pages).

* cited by examiner

Fig. 5

| | SENSING TIME | RESOURCES (ALLOCATED BAND) |
|---|---|---|
| STA1 | 10 | 20 MHz |
| STA2 | 20 | 40 MHz |
| STA3 | 30 | 80 MHz |

WIRELESS COMMUNICATION SYSTEM, WIRELESS COMMUNICATION METHOD AND WIRELESS BASE STATION DEVICE

CROSS-REFERENCE TO RELATED APPLICATION

The present application is based on PCT filing PCT/JP2021/043668, filed Nov. 29, 2021, the entire contents of which is incorporated herein by reference.

TECHNICAL FIELD

The present disclosure relates to a wireless communication system, a wireless communication method and a wireless base station device, and particularly relates to a wireless communication system, a wireless communication method and a wireless base station device suitable for implementing high-speed communication by a multi-link function.

BACKGROUND ART

Improving wireless capacity is important to manage an increasing mobile traffic. In recent years, use of the 6 GHz band has been examined in IEEE 802.11be, which is the next generation standard for wireless LANs. In the IEEE 802.11be standard, as described in Non Patent Literature 1 below, a multi-link function using a multi-link device (MLD) is adopted.

In the MLD, wireless interfaces corresponding to a plurality of wireless frequency bands are mounted in one housing. According to the multi-link function, a plurality of links as transmission paths is established by cooperation and coordination of the plurality of wireless interfaces. This makes it possible to implement high-speed and highly reliable communication.

CITATION LIST

Non Patent Literature

Non Patent Literature 1: "Current Status and Directions of IEEE 802.11be, the Future Wi-Fi 7", EVGENY KHOROV, ILYA LEVITSKY, AND IAN F. AKYILDIZ, IEEE Access, vol. 8, 2020, pp. 88664-88688, publication May 8, 2020.

SUMMARY OF INVENTION

Technical Problem

When a congested channel is selected in a communication system including an MLD, communication performance is deteriorated in all wireless terminals using the channel. Therefore, in the communication system including the MLD, it is effective to sense the degree of congestion of each channel, select a non-congested channel, and use the channel for communication.

It is also conceivable that a wireless base station device AP performs channel sensing by itself as in Dynamic Frequency Selection (DFS), which is introduced in wireless LANs of the 5 GHz band. However, when the AP executes sensing by itself, all the wireless terminals belonging to the control of the AP are in a communication disabled state during the execution, and the frequency utilization efficiency is deteriorated.

It is also conceivable that channel sensing is equally shared by the plurality of wireless terminals belonging to the control of the AP. However, under the control of the AP, a wireless terminal with high specifications and a wireless terminal with low specifications may be mixed and included. If the burden of sensing is evenly distributed under such an environment, the burden on a wireless terminal with low specifications is relatively large, and the communication quality of the terminal may be significantly deteriorated.

On the other hand, if a heavy sensing burden is imposed on a wireless terminal with high specifications, a wireless terminal with low specifications is relatively favorably treated. Such a situation is not preferable in securing fairness between wireless terminals, and also becomes a factor that hinders switching from a low-spec device to a high-spec device.

The present disclosure has been made in view of the above problems, and a first object thereof is to provide a wireless communication system that performs channel sensing without causing unfairness between wireless terminals and implements efficient communication by a multi-link function.

In addition, a second object of the present disclosure is to provide a wireless communication method for performing channel sensing without causing unfairness between wireless terminals and implementing efficient communication by a multi-link function.

Furthermore, a third object of the present disclosure is to provide a wireless base station device that performs channel sensing without causing unfairness between wireless terminals and implements efficient communication by a multi-link function.

Solution to Problem

In order to achieve the above objects, a first aspect of the present disclosure is a wireless communication system comprising: a plurality of wireless terminals each including a plurality of wireless interfaces corresponding to a plurality of channels in different frequency bands; and a wireless base station device that establishes wireless communication with the wireless terminals, and it is desirable that each of the wireless terminals includes:

a sensing unit that performs sensing on the channels; and a sensing information transmission unit that transmits sensing information including an identifier of a channel on which sensing has been performed, a sensing result of the channel, and an identifier of the wireless terminal, and the wireless base station device includes:

a sensing information reception unit that receives the sensing information;

a sensing time storage unit that calculates and stores a sensing time for each of the wireless terminals on the basis of the sensing information, the sensing time being an accumulated value of time required for sensing by the wireless terminal; and an allocation unit that allocates a reward according to the sensing time to each of the plurality of wireless terminals.

In addition, a second aspect of the present disclosure is a wireless communication method using a plurality of wireless terminals each including a plurality of wireless interfaces corresponding to a plurality of channels in different frequency bands, and a wireless base station device that establishes wireless communication with the wireless terminals, and it is desirable that the wireless communication method includes:

a step in which each of the wireless terminals performs sensing on the channels;

a step in which each of the wireless terminals transmits sensing information including an identifier of a channel on which sensing has been performed, a sensing result of the channel, and an identifier of the wireless terminal;

a step in which the wireless base station device receives the sensing information;

a step in which the wireless base station device calculates and stores a sensing time for each of the wireless terminals on the basis of the sensing information, the sensing time being an accumulated value of time required for sensing by the wireless terminal; and a step in which the wireless base station device allocates a reward according to the sensing time to each of the plurality of wireless terminals.

In addition, a third aspect of the present disclosure is a wireless base station device that establishes wireless communication with a plurality of wireless terminals each including a plurality of wireless interfaces corresponding to a plurality of channels in different frequency bands, and it is desirable that the wireless base station device includes:

a sensing information reception unit that receives sensing information transmitted by each of the wireless terminals, the sensing information including an identifier of a channel on which sensing has been performed, a sensing result of the channel, and an identifier of the wireless terminal;

a sensing time storage unit that calculates and stores a sensing time for each of the wireless terminals on the basis of the sensing information, the sensing time being an accumulated value of time required for sensing by the wireless terminal; and an allocation unit that allocates a reward according to the sensing time to each of the plurality of wireless terminals.

Advantageous Effects of Invention

According to the first to third aspects of the present disclosure, channel sensing is performed without causing unfairness between wireless terminals, so that it is possible to implement efficient communication by the multi-link function.

BRIEF DESCRIPTION OF DRAWINGS

FIG. 5 is a diagram for describing a relationship between sensing times and allocated resources, which is implemented in the first embodiment of the present disclosure.

DESCRIPTION OF EMBODIMENTS

First Embodiment

Configuration of First Embodiment

Figure 1:
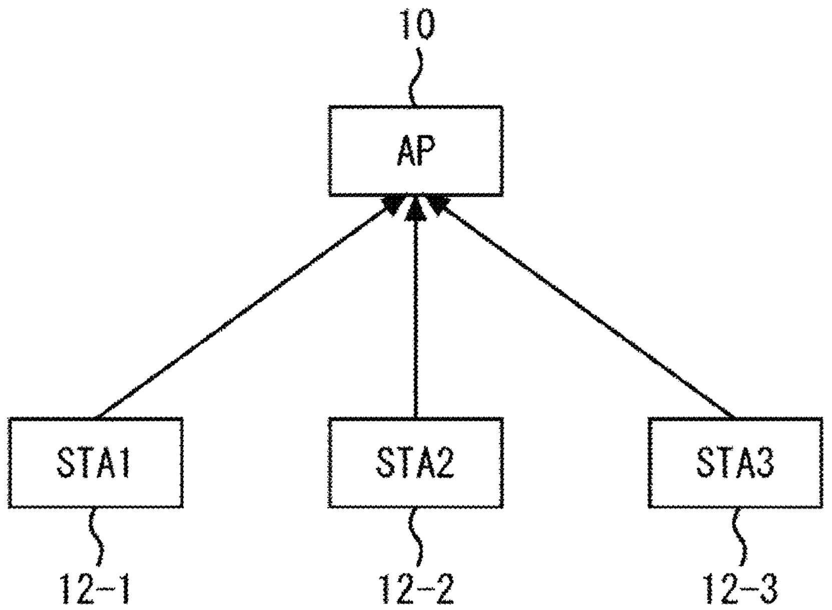
FIG. 1 is a diagram for describing a configuration of a wireless communication system of a first embodiment of the present disclosure.

FIG. 1 illustrates an overall configuration of a wireless communication system of a first embodiment of the present disclosure. The wireless communication system of the present embodiment includes a wireless base station device (AP) 10 as illustrated in FIG. 1. The AP 10 is an apparatus that functions as a base station of a wireless LAN, and is configured to be able to communicate with a high-order device via a network (not illustrated).

A plurality of wireless terminals (STAs) 12-1 to 12-3 is arranged under the control of the AP 10. Hereinafter, in a case where it is not necessary to distinguish the individual STAs, the additional numerals of the reference signs will be omitted and the STAs will be referred to as "STAs 12". In FIG. 1, there are three STAs 12 under the control of the AP 10, but the number of STAs 12 is not limited thereto, and may be smaller or larger.

The AP 10 and the STAs 12 can communicate with each other via wireless transmission links. Each of the AP 10 and the STAs 12 has a function as a multi-link device (MLD). More specifically, each of the AP 10 and the STAs 12 is equipped with a plurality of wireless interfaces corresponding to a plurality of frequency bands set to, for example, the 6 GHz band. The AP 10 and the STAs 12 can establish a plurality of transmission links therebetween by coordinating or coordinating their wireless interfaces. As a result, the AP 10 and the STAs 12 can implement high-speed and highly reliable communication by a multi-link function.

Figure 2:
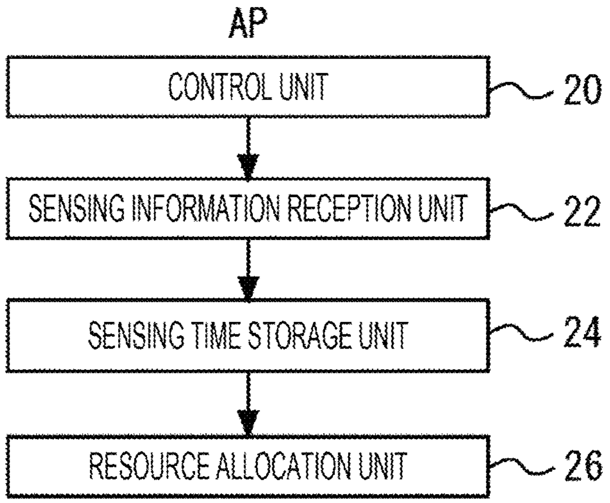
FIG. 2 is a block diagram for describing a functional configuration of a wireless base station device AP included in the wireless communication system of the first embodiment of the present disclosure.

FIG. 2 is a block diagram for describing a functional configuration of the AP 10. The AP 10 includes an arithmetic processing unit and a memory in addition to dedicated hardware. The memory stores a program executed by the arithmetic processing unit. The function of each block illustrated in FIG. 2 is implemented by the arithmetic processing unit proceeding with processing according to the program.

As illustrated in FIG. 2, the AP 10 includes a control unit 20. The control unit 20 is a unit that controls the function of each block described below in order to implement various functions of the AP 10.

The AP 10 includes a sensing information reception unit 22. In the present embodiment, as will be described later, sensing by the STAs 12 is performed for each of a plurality of channels scheduled to be used for wireless communication. For example, in the 6 GHz band, it is assumed that about 90 channels are prepared. In the present embodiment, the plurality of STAs 12 belonging to the control of the AP 10 allots the channels, senses the degree of congestion of each channel, and provides the results to the AP 10. The sensing information reception unit 22 has a function of receiving the results of sensing transmitted from the STAs 12 and storing the results as sensing information.

The AP 10 includes a sensing time storage unit 24. Each piece of the sensing information includes the identifier of the STA 12 that has issued the information and the time required for the current sensing, that is, the time for which the channel to be sensed has been monitored. The sensing time storage unit 24 has a function of accumulating the sensing implementation time for each of the STAs 12 on the basis of the pieces of information and recording how much time each of the STAs 12 has spent for sensing. Hereinafter, the time recorded in this manner is referred to as "sensing time". Note that the sensing time may be reset at a predetermined period and periodically updated, or basic data may be continuously updated with the lapse of time such that an accumulated time per certain time is always the sensing time.

The AP 10 further includes a resource allocation unit 26. The plurality of STAs 12 shares finite communication resources and each establishes communication with the AP 10. For example, the above-described channels themselves, the occupancy time in each channel, and the like correspond to the communication resources. The resource allocation unit 26 has a function of determining resource allocation to each of the plurality of STAs 12 and giving a command of the determination results to each of the STAs 12.

Note that the AP 10 includes a communication interface for establishing wired communication with a high-order device and a communication interface for establishing wireless communication with the STAs 12. These are not illustrated for convenience.

Figure 3:
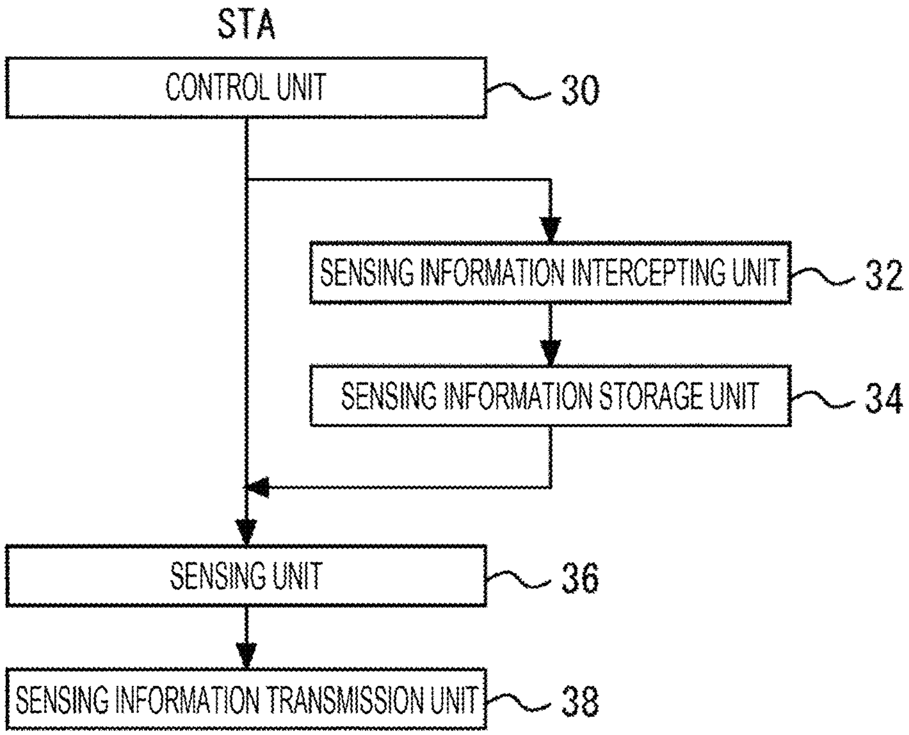
FIG. 3 is a block diagram for describing a functional configuration of a wireless terminal STA included in the wireless communication system of the first embodiment of the present disclosure.

FIG. 3 is a block diagram for describing a functional configuration of one of the STAs 12. As in the AP 10, the STA 12 also includes an arithmetic processing unit and a memory in addition to dedicated hardware. In addition, the function of each block illustrated in FIG. 3 is implemented by the arithmetic processing unit proceeding with processing according to a program stored in the memory.

As illustrated in FIG. 3, the STA 12 includes a control unit 30. The control unit 30 is a unit that controls the function of each block described below in order to implement various functions of the STA 12.

The STA 12 includes a sensing information intercepting unit 32 and a sensing information storage unit 34. In the present embodiment, as described above, sensing by the STAs 12 is performed for each of the channels used for wireless communication. Each of the STAs 12 transmits a result of sensing by a broadcasting method. The sensing information intercepting unit 32 is a block for intercepting sensing information issued from another STA 12. In addition, the sensing information storage unit 34 is a block for recording the intercepted sensing information. With the functions of these blocks, a result of sensing performed by one STA 12 is shared by all the other STAs 12.

The STA 12 also includes a sensing unit 36. The sensing unit 36 recognizes channels on which sensing has not been performed on the basis of the information stored in the sensing information storage unit 34, and performs sensing for one of the channels. Specifically, sensing is performed by monitoring one channel and measuring a rate of time for which a wireless signal flows in the channel, that is, an air-time occupancy rate.

The STA 12 includes a sensing information transmission unit 38. The sensing information transmission unit 38 has a function of transmitting sensing information by the above-described broadcast method. The sensing information includes not only the identifier of the STA 12 that transmits the information, the identifier of the monitored channel, and the air time occupancy rate measured in the channel, but also the time for which the channel has been monitored for the current sensing.

Note that the STA 12 also includes a communication interface, but the illustration thereof is omitted for convenience as in the case of the AP 10.

Flow of Processing in First Embodiment

Figure 4:
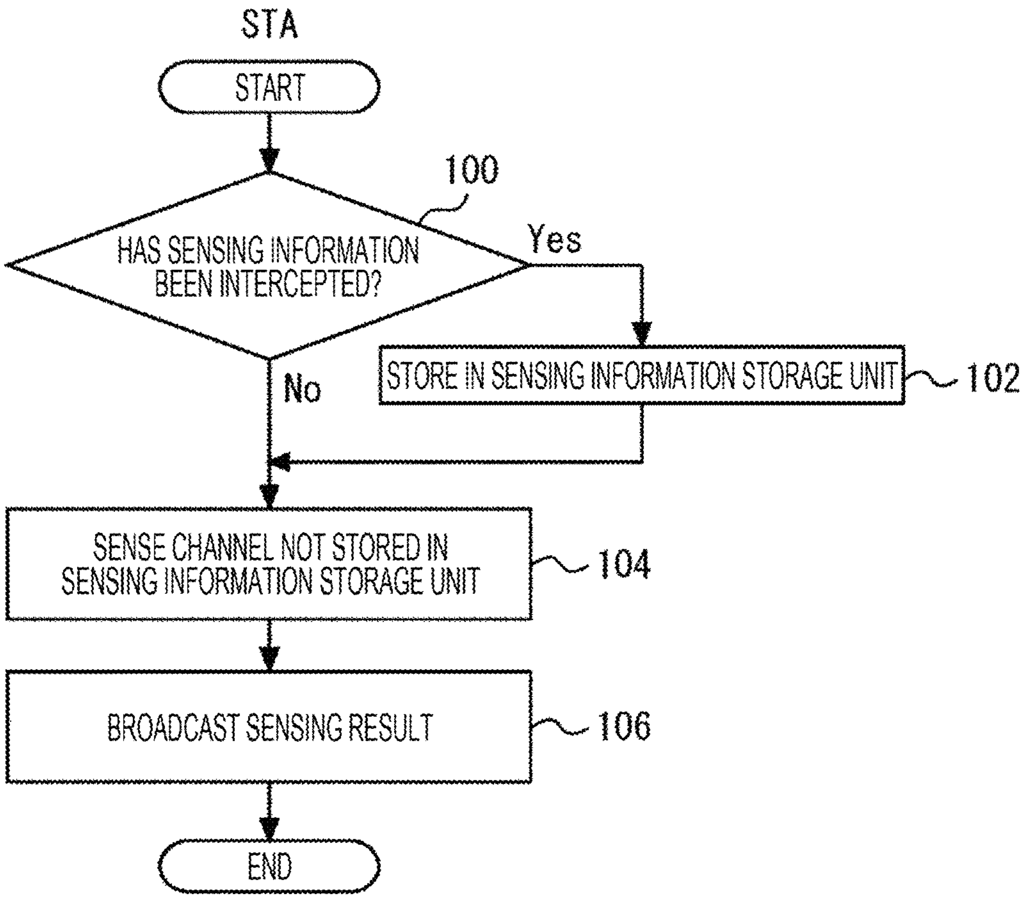
FIG. 4 is a flowchart for describing a flow of a main part of processing performed by a wireless terminal STA in the first embodiment of the present disclosure.

FIG. 4 is a flowchart for describing a flow of processing executed by one of the STAs 12 to sense a channel in the present embodiment. The routine illustrated in FIG. 4 is repeatedly executed in all the STAs 12 belonging to the control of the AP 10. The repetition period is determined according to specifications and the like of each of the STAs 12. As a result, in a STA 12 with high specifications, the routine illustrated in FIG. 4 is usually repeated with a shorter period than in the case of a STA 12 with low specifications.

In the routine illustrated in FIG. 4, first, it is determined whether or not sensing information issued from another STA 12 has been intercepted (step 100). In a case where interception of sensing information is not recognized, step 102 is jumped, and then the processing of step 104 is executed.

On the other hand, in a case where interception of sensing information is recognized, the intercepted sensing information is stored in the sensing information storage unit 34 (step 102). As described above, the sensing information includes the identifier of the sensed channel, the air-time occupancy rate indicating the degree of congestion of the channel, and the like. In this step 102, among these pieces of information, at least the identifier of the channel is stored in the sensing information storage unit 34.

When the above processing ends, next, a channel to be sensed is selected, and the degree of congestion of the channel is sensed (step 104). Here, first, channels whose identifiers are not stored in the sensing information storage unit 34 are extracted. Next, from among the extracted channels, a target channel is determined according to a predetermined rule such as an ascending order or descending order rule based on frequency. The target channel is then monitored for a specified time, so that the air-time occupancy rate of the channel is sensed.

When the sensing on the target channel is finished, the result is transmitted by a broadcasting method (step 106). At this time, the identifier of the channel on which sensing has been performed is stored in the sensing information storage unit 34 as in the case of step 102 described above. Therefore, the identifiers of channels on each of which sensing has been performed in any of the STAs 12 are accumulated and stored in the sensing information storage units 34 of all the STAs 12.

According to the above processing, each individual STA 12 can determine a channel to be sensed excluding channels already sensed by the other STAs 12 and channels already sensed by itself. Therefore, according to the present embodiment, it is possible to avoid implementation of redundant and ineffectual sensing.

Note that the identifiers stored in the sensing information storage unit 34 may be erased after a certain period of time elapses. In this case, the channels on which sensing has been performed are returned to channels on which sensing has not been performed after the certain period of time, and are to be sensed again. This processing makes it possible to prevent old sensing information from remaining.

FIG. 5 illustrates a relationship between sensing times of the three STAs 12 belonging to the control of the AP 10 and communication resources allocated by the AP 10 to the STAs 12. Specifically, FIG. 5 illustrates that the STAs 12-1, 12-2, and 12-3 have spent sensing times of 10 sec, 20 sec, and 30 sec, respectively. These values are different due to a difference in specifications of the STAs 12-1 to 12-3, a difference in time that the STAs 12-1 to 12-3 can allocate for channel sensing, and the like.

FIG. 5 also illustrates that the AP 10 allocates a band of 20 MHz, 40 MHz, or 80 MHz to each of the STAs 12-1, 12-2, and 12-3. That is, the AP 10 allocates communication resources as a reward for performing channel sensing. The AP 10 allocates the most communication resources to the STA 12-3, which has the longest sensing time, and allocates the least communication resources to the STA 12-1, which has the shortest sensing time. According to such allocation, unfairness between terminals that is caused by a burden of channel sensing can be resolved by a reward in the form of communication resources.

Figure 6:
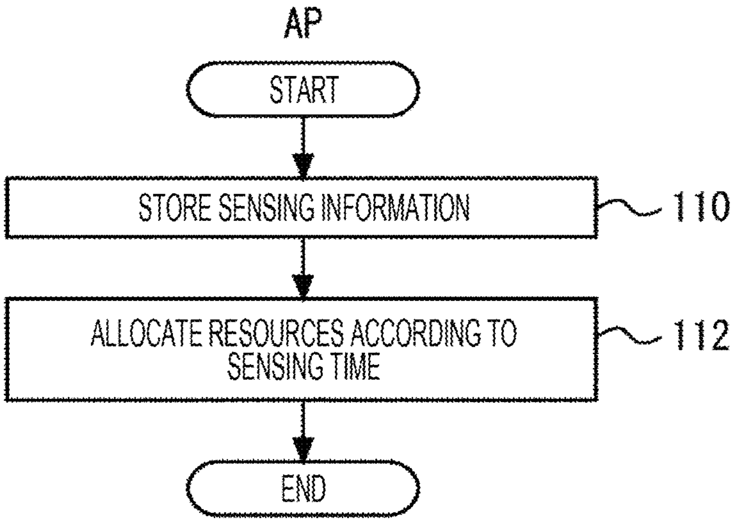
FIG. 6 is a flowchart for describing a flow of a main part of processing performed by the wireless base station device AP in the first embodiment of the present disclosure.

FIG. 6 is a flowchart for describing a flow of processing performed by the AP 10 in the present embodiment for implementing the above-described functions. The routine illustrated in FIG. 6 is started every time sensing information is broadcast from any of the STAs 12.

In the routine illustrated in FIG. 6, first, broadcast sensing information is stored in the AP 10 (step 110). By accumulating the sensing information, the AP 10 grasps to what extent each frequency band is congested and how much sensing time each of the STAs 12 has spent.

Next, the AP 10 allocates communication resources according to the sensing time to each of the STAs 12 belonging to the control of the AP (step 112). Specifically, the AP 10 performs processing for allocating many communication resources to a STA 12 having a long sensing time and allocating few communication resources to a STA 12 having a short sensing time. As described with reference to FIG. 5, the resources can be increased or decreased by variation in the frequency bandwidth. Alternatively, the resources may be increased or decreased by variation in the occupancy time of the band.

As described above, in the wireless communication system of the present embodiment, it is not necessary to perform channel sensing in the AP 10. Therefore, according to this system, it is possible to reliably avoid occurrence of a situation in which all the STAs 12 belonging to the control of the AP 10 become uncommunicable when channel sensing is performed.

Furthermore, in the system of the present embodiment, the plurality of STAs 12 performs channel sensing with loads according to their specifications or the like. Therefore, a STA 12 with low specifications does not bear a relatively heavy load, and it is possible to avoid significant deterioration in the communication quality of such an STA 12.

Furthermore, in the system of the present embodiment, each of the STAs 12 is given communication resources that serve as a reward for channel sensing and are appropriate to a load. Therefore, unfairness between the STAs 12 is resolved, and it is also possible to avoid hindrance of an incentive to switch a low-spec device to a high-spec device.

Second Embodiment

Features of Second Embodiment

Next, a second embodiment of the present disclosure will be described with reference to FIGS. 7 to 10 together with FIG. 1. The wireless communication system of the present embodiment can be implemented by the configuration illustrated in FIG. 1 as in the case of the first embodiment.

Figure 7:
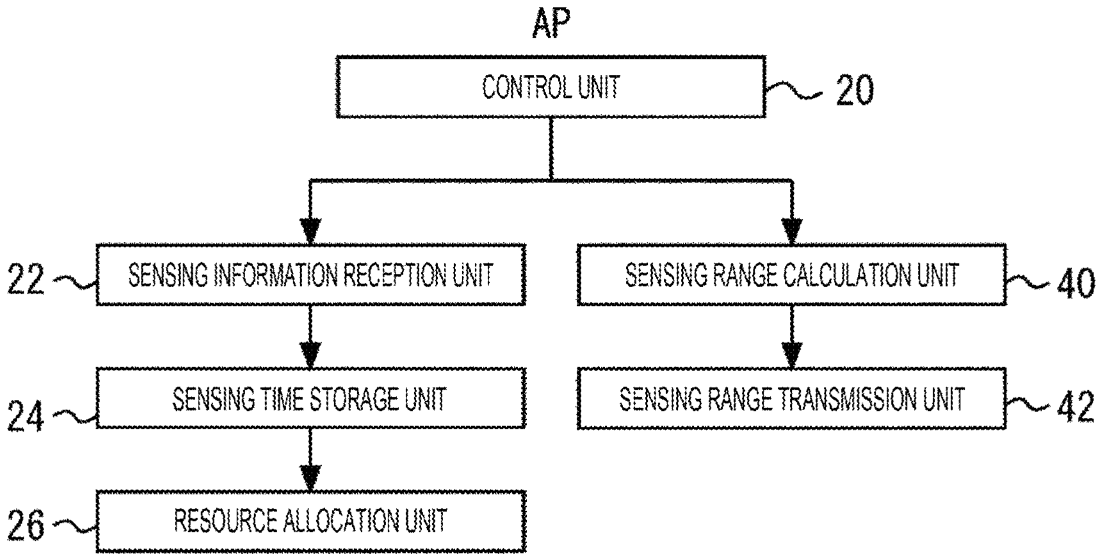
FIG. 7 is a block diagram for describing a functional configuration of a wireless base station device AP included in a wireless communication system of a second embodiment of the present disclosure.

FIG. 7 is a block diagram for functionally describing a configuration of an AP 10 used in the present embodiment. Note that, in FIG. 7, elements that are the same as or corresponding to elements illustrated in FIG. 3 are denoted by the same reference signs, and the description thereof will be omitted or simplified. In addition, as in the case of the first embodiment, the AP 10 includes an arithmetic processing unit and a memory, and each element illustrated in FIG. 7 is implemented by the arithmetic processing unit proceeding with processing according to a program stored in the memory.

As illustrated in FIG. 7, the AP 10 used in the present embodiment includes a sensing range calculation unit 40. The sensing range calculation unit 40 has a function of setting specific channels as a sensing range in a case where the AP 10 wants to know a congested state of the channels. For example, a channel for which acquired sensing information is old and the information is desired to be updated, a channel for which sensing information has not been obtained in a band to be allocated to STAs 12, and the like are set as a sensing range.

The sensing range set by the sensing range calculation unit 40 is provided to a sensing range transmission unit 42. More specifically, identifiers of channels included in the sensing range are provided to the sensing range transmission unit 42. The sensing range transmission unit 42 then transmits the identifiers of the channels constituting the sensing range to all the STAs 12 under the control of the AP 10 by a broadcast method.

Figure 8:
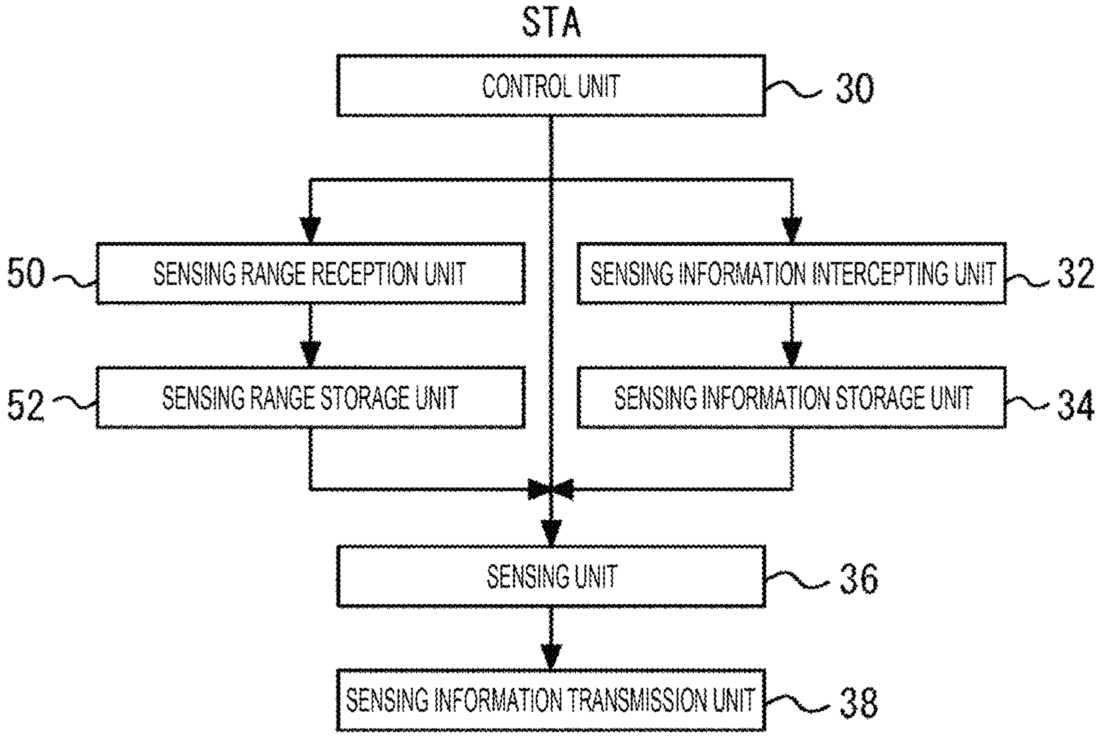
FIG. 8 is a block diagram for describing a functional configuration of a wireless terminal STA included in the wireless communication system of the second embodiment of the present disclosure.

FIG. 8 is a block diagram for functionally describing a configuration of one of the STAs 12 used in the present embodiment. Note that, in FIG. 8, elements that are the same as or corresponding to elements illustrated in FIG. 3 are denoted by the same reference signs, and the description thereof will be omitted or simplified. Furthermore, as in the case of the first embodiment, the function of each block included in the STA 12 is also implemented by an arithmetic processing unit proceeding with processing according to a program stored in a memory.

As illustrated in FIG. 8, the STA 12 used in the present embodiment includes a sensing range reception unit 50. The sensing range reception unit 50 has a function of receiving a sensing range transmitted from the AP 10. The sensing range received by the sensing range reception unit 50 is stored in a sensing range storage unit 52.

That is, in the STA 12 of the present embodiment, the identifiers of channels that the AP 10 requests to sense are stored in the sensing range storage unit 52. In addition, as in the case of the first embodiment, the identifiers of channels sensed by itself or the other STAs 12 are stored in the sensing information storage unit 34.

In the present embodiment, in a case where the sensing range storage unit 52 includes an identifier, the sensing unit 36 of the STA 12 performs sensing on a channel corresponding to the identifier. In a case where the sensing range storage unit 52 includes no identifier, sensing is performed on a channel whose identifier is not stored in the sensing information storage unit 34. As a result, in the present embodiment, sensing required by the AP 10 is preferentially performed, and redundant sensing on the already sensed channels is effectively avoided as in the case of the first embodiment.

Flow of Processing in Second Embodiment

Figure 9:
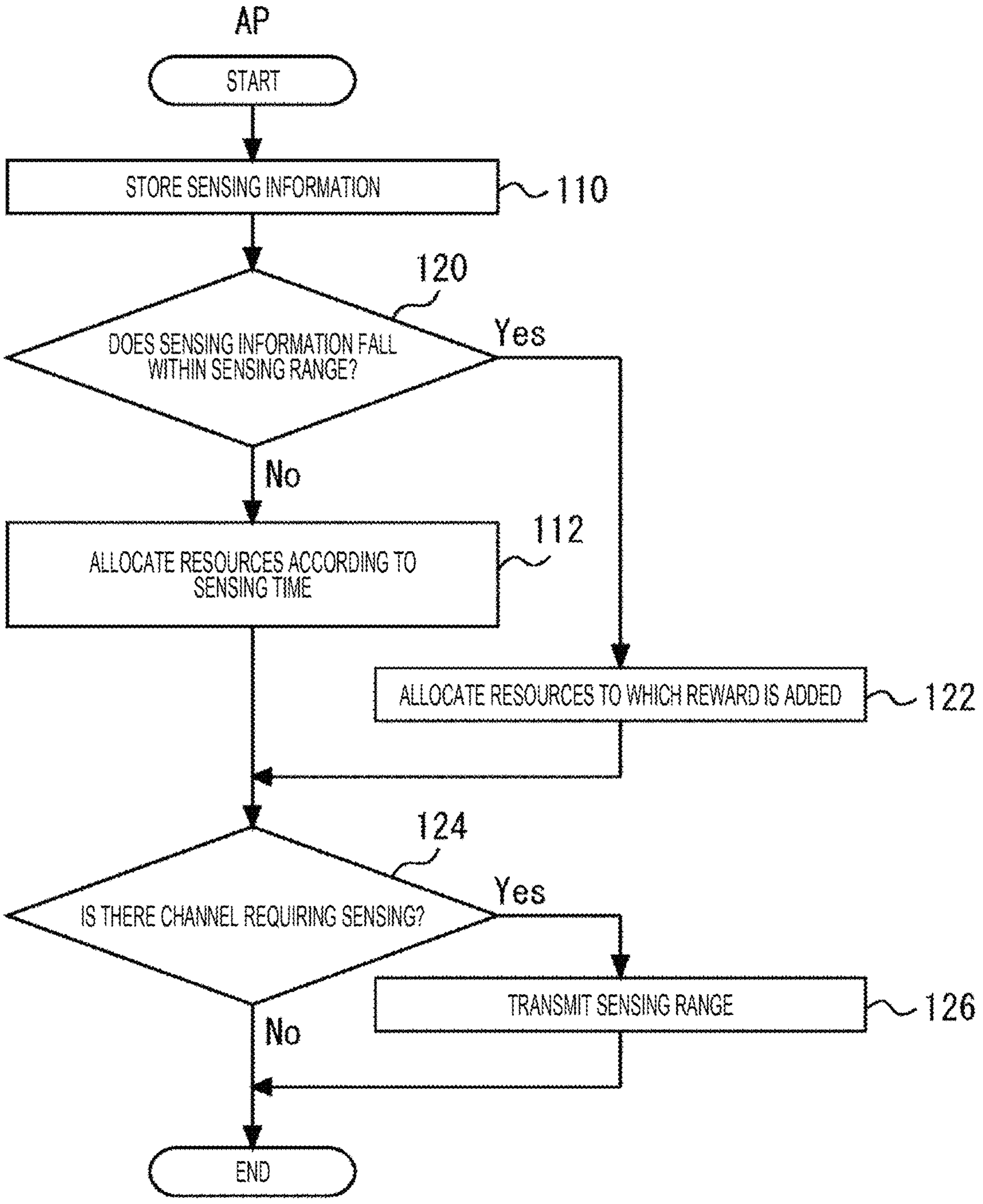
FIG. 9 is a flowchart for describing a flow of a main part of processing performed by the wireless base station device AP in the second embodiment of the present disclosure.

FIG. 9 is a flowchart for describing a flow of processing performed by the AP 10 in the present embodiment. Note that, in FIG. 9, steps that are the same as or correspond to steps illustrated in FIG. 6 are denoted by the same reference signs, and redundant description will be omitted.

The routine illustrated in FIG. 9 is started when the AP 10 receives sensing information from any of the STAs 12, as in the case of the first embodiment. In the present embodiment, when the sensing information is stored in step 110, next, it is determined whether or not a channel related to the sensing information falls within a sensing range designated by the AP 10 (step 120).

In a case where it is determined that the channel related to the received information does not fall within the sensing range, the processing of step 112 is executed in order to proceed with resource allocation as in the case of the first embodiment.

On the other hand, in a case where the channel related to the received information is recognized to fall within the sensing range, resources to which an additional reward is added are allocated to the STA 12 that has performed sensing on the channel (step 122). That is, sensing performed in response to the request of the AP 10 is evaluated, and resources obtained by adding a certain proportion to the resources determined in step 112 are allocated to the STA 12 that has performed the sensing.

After the above processing ends, next, it is determined whether or not there is a channel requiring sensing for the AP 10 (step 124). For example, it is determined whether there is a channel for which information is old beyond a determination criterion, or whether there is a channel that is an allocation possibility but for which sensing information has not been obtained. When it is recognized that there is such a channel, it is determined that there is a channel requiring sensing.

In step 124 described above, in a case where it is determined that there is no channel requiring sensing, this routine ends as it is. On the other hand, in a case where it is determined that there is a channel requiring sensing, the range of the channel, which serves as a sensing range, is transmitted to the STAs 12 under the control of the AP 10 (step 126).

Figure 10:
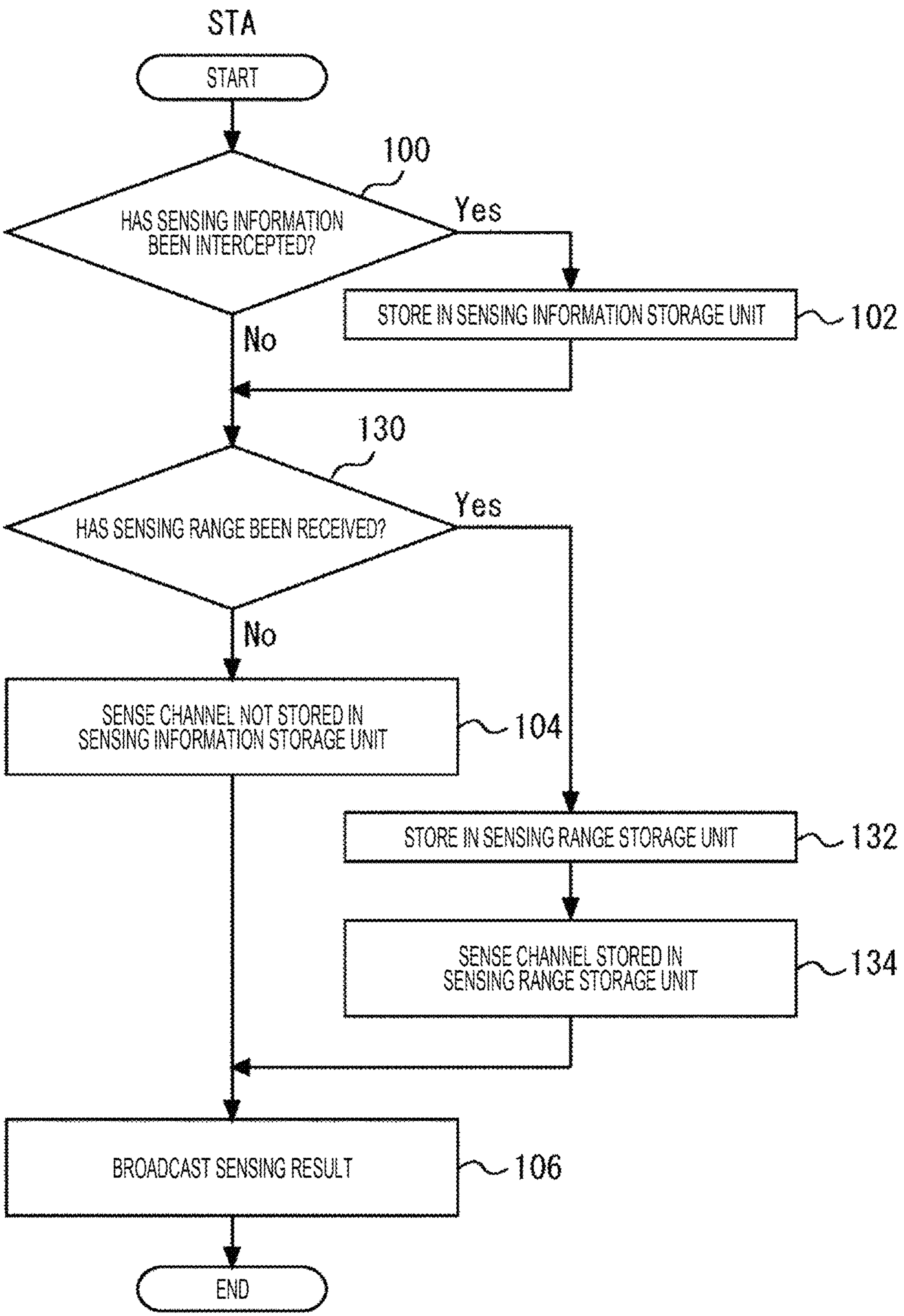
FIG. 10 is a flowchart for describing a flow of a main part of processing performed by a wireless terminal STA in the second embodiment of the present disclosure.

FIG. 10 is a flowchart for describing a flow of processing performed by one of the STAs 12 in the present embodiment. Note that, in FIG. 10, steps that are the same as or correspond to steps illustrated in FIG. 4 are denoted by the same reference signs, and redundant description will be omitted.

As illustrated in FIG. 10, following the processing of step 100 or step 102, the STA 12 in the present embodiment determines whether or not a sensing range has been received (step 130). That is, it is determined whether or not the STA 12 has received information regarding a sensing range issued by the AP 10 for implementation of sensing.

In a case where no sensing range has been received, the processing of step 104 is executed thereafter as in the case of the first embodiment. In this case, sensing is performed for a channel whose identifier is not stored in the sensing information storage unit 34, that is, a channel on which sensing has not been performed by the STAs 12.

On the other hand, in a case where reception of a sensing range is recognized in step 130, first, the identifiers of channels corresponding to the sensing range are stored in the sensing range storage unit 52 (step 132). Sensing is then performed on the channels corresponding to the identifiers stored in the sensing range storage unit 52 (step 134).

After the above processing is completed, the STA 12 transmits the result of sensing by a broadcasting method by the processing of step 106.

According to the above processing, in a case where there is a range of channels desired to be preferentially sensed, the AP 10 can widely transmit the request to all the STAs 12 under the control of the AP. A STA 12 having a function to meet the request then performs channel sensing in response to the request. Therefore, according to the present embodiment, it is possible to provide the AP 10 with excellent information collection capability. The AP 10 has the excellent information collection capability, so that the communication efficiency of the wireless communication system can be enhanced.

Furthermore, according to the above processing, the STA 12 that has performed channel sensing in response to the sensing range issued by the AP 10 is given communication resources corresponding to the sum of a reward for a sensing load and a reward for meeting the request of the AP 10. According to such a rule, it is possible to generate an incentive to give the STA 12 a function that meets the request of the AP 10, and it is possible to promote the efficiency of the wireless communication system.

Modifications of First and Second Embodiments

Incidentally, in the first and second embodiments described above, the description has been made with the field of wireless communication limited to a wireless LAN, but the present disclosure is not limited thereto. In addition to a wireless LAN, the technique of the present disclosure can also be applied to, for example, wireless communication such as Bluetooth (registered trademark), wireless communication using a license band, or the like.

In addition, in the first and second embodiments described above, a reward for performing channel sensing or a reward for meeting a request from the AP 10 is given by allocation of communication resources. However, the present disclosure is not limited thereto, and these rewards may be implemented by another method serving as an incentive for a user, for example, lowering the usage fee of the wireless communication by the STAs 12.

Furthermore, in the first and second embodiments described above, each of the STAs 12 transmits sensing information including a monitoring time associated with one time of sensing to the AP 10. However, the monitoring time associated with one time of sensing may be unified for all the STAs 12, so that the monitoring time may not be included in the sensing information. In this case, the AP 10 may calculate the "sensing time" by multiplying the unified monitoring time by the number of sensing implementations.

Furthermore, in the first and second embodiments described above, each of the STAs 12 transmits sensing information every time sensing on one channel is completed, but the present disclosure is not limited thereto. For example, each of the STAs 12 may continuously perform sensing for a certain period of time, and collectively transmit a plurality of results of sensing obtained during the period.

Alternatively, each of the STAs 12 may collectively perform sensing on a predetermined number of channels and collectively transmit the results.

Furthermore, in the above-described second embodiment, the AP 10 transmits channels requiring sensing as a sensing range to the STAs 12. The STAs 12 then store the range in the sensing range storage unit 52, and preferentially perform sensing for the channels stored therein. However, the transmission method of the sensing range is not limited thereto. For example, the AP 10 may determine a channel on which sensing has just been performed, a channel not scheduled to be allocated to the STAs 12, or the like as a channel requiring no sensing, and transmit a range requiring no sensing to the STAs 12. In this case, the STAs 12 delete identifiers corresponding to the range requiring no sensing from the sensing range storage unit 52. As a result, it is possible to preferentially proceed with sensing on a channel on which the AP 10 desires to perform sensing.

REFERENCE SIGNS LIST

10 Wireless base station device (AP)
12-1, 12-2, 12-3, 12 Wireless terminal (STA)
20, 30 Control unit
22 Sensing information reception unit
24 Sensing time storage unit
26 Resource allocation unit
32 Sensing information intercepting unit
34 Sensing information storage unit
36 Sensing unit
38 Sensing information transmission unit
40 Sensing range calculation unit
42 Sensing range transmission unit
50 Sensing range reception unit
52 Sensing range storage unit

The invention claimed is:

1. A wireless communication system comprising:
a plurality of wireless terminals each including a plurality of wireless interfaces corresponding to a plurality of channels in different frequency bands; and
a wireless base station device that establishes wireless communication with the wireless terminals, wherein
each of the wireless terminals includes:
a sensing circuitry that performs sensing on the channels; and
a sensing information transmitter that transmits sensing information including an identifier of a channel on which sensing has been performed, a sensing result of the channel, and an identifier of the wireless terminal, and
the wireless base station device includes:
a sensing information receiver that receives the sensing information;
a sensing time storage circuitry that calculates and stores a sensing time for each of the wireless terminals on a basis of the sensing information, the sensing time being an accumulated value of time required for sensing by the wireless terminal; and
an allocation circuitry that allocates a reward according to the sensing time to each of the plurality of wireless terminals.

2. The wireless communication system according to claim 1, wherein
the sensing information transmitter is configured to transmit at least the identifier of the channel on which sensing has been performed among the sensing information by a broadcasting method,
each of the wireless terminals further includes a sensing information intercepting circuitry that intercepts information on the identifier broadcast from another wireless terminal, and
the sensing circuitry is configured to select a channel to be sensed from among channels excluding a channel on which sensing has been performed by the sensing circuitry itself and a channel corresponding to the intercepted identifier.

3. The wireless communication system according to claim 2, wherein the reward is communication resources having an amount determined according to the sensing time.

4. The wireless communication system according to claim 3, wherein
the wireless base station device further includes:
a sensing range calculator that calculates sensing range information designating an implementation range of sensing; and
a sensing range transmitter that transmits the sensing range information to the wireless terminals,
each of the wireless terminals further includes a sensing range receiver that receives the sensing range information, and
the sensing circuitry is configured to select a channel to be sensed from an implementation range of sensing in a case where the implementation range is designated by the sensing range information.

5. The wireless communication system according to claim 4, wherein the allocation circuitry is configured to allocate an additional reward to a wireless terminal that has provided the sensing information which includes the identifier of the channel falling within the implementation range.

6. The wireless communication system according to claim 5, wherein
the sensing range information includes information designating a channel on which sensing does not need to be performed, and
the sensing circuitry is configured to exclude a channel which is designated by the sensing range information as a channel on which sensing does not need to be performed from channels to be sensed.

7. The wireless communication system according to claim 4, wherein
the sensing range information includes information designating a channel on which sensing does not need to be performed, and
the sensing circuitry is configured to exclude a channel which is designated by the sensing range information as a channel on which sensing does not need to be performed from channels to be sensed.

8. The wireless communication system according to claim 2, wherein
the wireless base station device further includes:
a sensing range calculator that calculates sensing range information designating an implementation range of sensing; and
a sensing range transmitter that transmits the sensing range information to the wireless terminals,
each of the wireless terminals further includes a sensing range receiver that receives the sensing range information, and
the sensing circuitry is configured to select a channel to be sensed from an implementation range of sensing in a case where the implementation range is designated by the sensing range information.

9. The wireless communication system according to claim 8, wherein the allocation circuitry is configured to allocate an additional reward to a wireless terminal that has provided the sensing information which includes the identifier of the channel falling within the implementation range.

10. The wireless communication system according to claim 8, wherein the sensing range information includes information designating a channel on which sensing does not need to be performed, and the sensing circuitry is configured to exclude a channel which is designated by the sensing range information as a channel on which sensing does not need to be performed from channels to be sensed.

11. The wireless communication system according to claim 1, wherein the reward is communication resources having an amount determined according to the sensing time.

12. The wireless communication system according to claim 11, wherein the wireless base station device further includes:

a sensing range calculator that calculates sensing range information designating an implementation range of sensing; and a sensing range transmitter that transmits the sensing range information to the wireless terminals, each of the wireless terminals further includes a sensing range receiver that receives the sensing range information, and the sensing circuitry is configured to select a channel to be sensed from an implementation range of sensing in a case where the implementation range is designated by the sensing range information.

13. The wireless communication system according to claim 12, wherein the allocation circuitry is configured to allocate an additional reward to a wireless terminal that has provided the sensing information which includes the identifier of the channel falling within the implementation range.

14. The wireless communication system according to claim 12, wherein the sensing range information includes information designating a channel on which sensing does not need to be performed, and the sensing circuitry is configured to exclude a channel which is designated by the sensing range information as a channel on which sensing does not need to be performed from channels to be sensed.

15. The wireless communication system according to claim 1, wherein the wireless base station device further includes:

a sensing range calculator that calculates sensing range information designating an implementation range of sensing; and a sensing range transmitter that transmits the sensing range information to the wireless terminals, each of the wireless terminals further includes a sensing range receiver that receives the sensing range information, and the sensing circuitry is configured to select a channel to be sensed from an implementation range of sensing in a case where the implementation range is designated by the sensing range information.

16. The wireless communication system according to claim 15, wherein the allocation circuitry is configured to allocate an additional reward to a wireless terminal that has provided the sensing information which includes the identifier of the channel falling within the implementation range.

17. The wireless communication system according to claim 15, wherein the sensing range information includes information designating a channel on which sensing does not need to be performed, and the sensing circuitry is configured to exclude a channel which is designated by the sensing range information as a channel on which sensing does not need to be performed from channels to be sensed.

18. The wireless communication system according to claim 16, wherein the sensing range information includes information designating a channel on which sensing does not need to be performed, and the sensing circuitry is configured to exclude a channel which is designated by the sensing range information as a channel on which sensing does not need to be performed from channels to be sensed.

19. A wireless communication method using a plurality of wireless terminals each including a plurality of wireless interfaces corresponding to a plurality of channels in different frequency bands, and a wireless base station device that establishes wireless communication with the wireless terminals, the wireless communication method comprising:

performing, by each of the wireless terminals, sensing on the channels;

transmitting, by each of the wireless terminals, sensing information including an identifier of a channel on which sensing has been performed, a sensing result of the channel, and an identifier of the wireless terminal;

receiving, by the wireless base station device, the sensing information;

calculating and storing, by the wireless base station device, a sensing time for each of the wireless terminals on a basis of the sensing information, the sensing time being an accumulated value of time required for sensing by the wireless terminal; and allocating, by the wireless base station device, a reward according to the sensing time to each of the plurality of wireless terminals.

20. A wireless base station device that establishes wireless communication with a plurality of wireless terminals each including a plurality of wireless interfaces corresponding to a plurality of channels in different frequency bands, the wireless base station device comprising:

a sensing information receiver that receives sensing information transmitted by each of the wireless terminals, the sensing information including an identifier of a channel on which sensing has been performed, a sensing result of the channel, and an identifier of the wireless terminal;

a sensing time storage circuitry that calculates and stores a sensing time for each of the wireless terminals on a basis of the sensing information, the sensing time being an accumulated value of time required for sensing by the wireless terminal; and an allocation circuitry that allocates a reward according to the sensing time to each of the plurality of wireless terminals.

* * * * *